Figure 1:
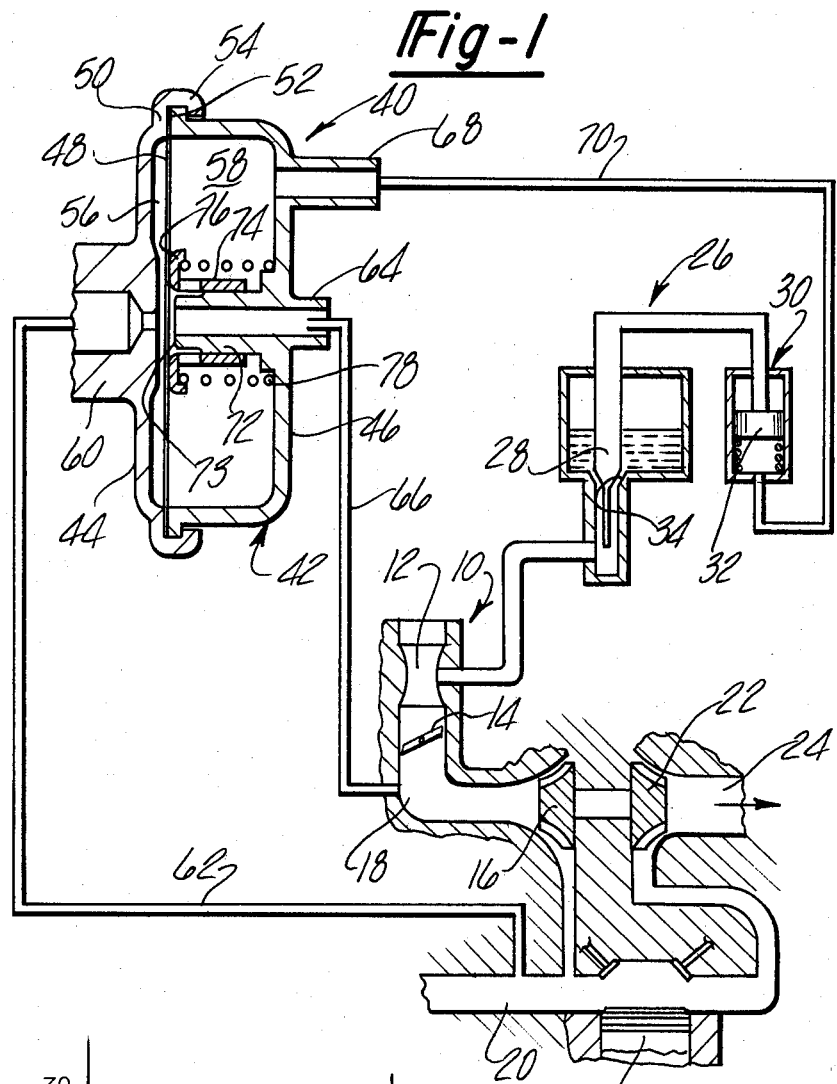

United States Patent [19]

Detweiler

[11] 4,241,711
[45] Dec. 30, 1980

[54] FUEL CONTROL SYSTEM
[75] Inventor: Charles A. Detweiler, Durand, Mich.
[73] Assignee: Schmelzer Corporation, Durand, Mich.
[21] Appl. No.: 966,616
[22] Filed: Dec. 5, 1978
[51] Int. Cl.³ ............................................. F02B 33/00
[52] U.S. Cl. .................................................. 123/559
[58] Field of Search ....................... 60/601, 603, 605; 123/119 C, 119 CE

[56] References Cited
U.S. PATENT DOCUMENTS

| 2,070,009 | 2/1937 | Goodman | 123/119 C |
| 2,223,381 | 12/1940 | Mock | 123/119 C X |
| 2,324,599 | 7/1943 | Schorn | 123/119 C |
| 2,369,665 | 2/1945 | Gosslau | 123/119 C X |
| 4,142,494 | 3/1979 | Negri et al. | 123/119 C |

Primary Examiner—Michael Koczo
Attorney, Agent, or Firm—Fisher, Gerhardt, Crampton & Groh

[57] ABSTRACT

A fuel control system for a turbocharged engine having fuel delivered to the carburetor under the control of a vacuum operated device which is under the further control of a device sensing pressures upstream and downstream of the turbo charger compressor and delivering a vacuum signal to the fuel control device in proportion to the manifold pressure even though the latter pressure may be a positive pressure.

5 Claims, 2 Drawing Figures

U.S. Patent

Dec. 30, 1980

4,241,711

FUEL CONTROL SYSTEM

This invention relates to internal combustion engines and more particularly to air fuel induction systems for turbocharged internal combustion engines.

In naturally aspirated carburetion systems of internal combustion engines the vacuum pressure level immediately below the carburetor throttle plate is an accurate indication of engine load and as a consequence can be used to regulate devices operable in proportion to engine loading. One such control device is sometimes referred to as a power enrichment device and operates in a manner to supply fuel to the induction passage in the carburetor in a fuel to air ratio proportional to the engine load. In other words, under light engine loads there is a high vacuum pressure resulting in metering of a small amount of fuel in proportion to the amount of air and conversely under heavy load there is a low vacuum pressure resulting in a large amount of fuel in proportion to the amount of air.

With turbocharged engines in which a compressor is located between the carburetor and intake manifold, the vacuum signal originating immediately below the carburetor may not accurately reflect the manifold absolute pressure and therefore may not accurately indicate engine loading. With turbocharged engines the intake manifold pressure can vary from a subatmospheric or vacuum pressure to pressures in excess of atmospheric pressure.

In copending application Ser. No. 829,225 filed Aug. 3, 1977, now abandoned, and assigned to the assignee of this application, a device is disclosed in which the vacuum responsive control devices are interrupted in their operations when the pressure at the manifold and downstream of the turbocharger reaches some precalibrated level.

It is an object of the present invention to provide a control device for turbo charged engines in which the vacuum signal to a fuel control system increases as manifold pressure decreases in an inverse proportion to each other.

The objects of the invention are accomplished by an induction system in which air and fuel is drawn through a carburetor and a compressor section of a turbocharger into the intake manifold and the supply of fuel to the carburetor is partially controlled by a fuel control device which is responsive to pressure reflecting the speed and load at which the engine is operating. The fuel control device is under the control of a device incorporating a housing in which a diaphragm forms a pair of chambers at opposite sides. One of the chambers is connected to the path of the fuel air movement at a point upstream of the compressor and the other chamber is connected at a point downstream of the compressor. The diaphragm is movable in response to differential pressure in the chambers to move into engagement with a valve seat controlling communication between a point upstream of the compressor and vacuum device controlling the fuel metering device. The diaphragm is biased away from the valve seat in such a manner that the fuel control device remains in communication upstream of said compressor to obtain a vacuum signal unless the pressure downstream of said compressor exceeds the total opposing force which is the sum of the pressure upstream of the compressor and the spring force.

Figure 2:
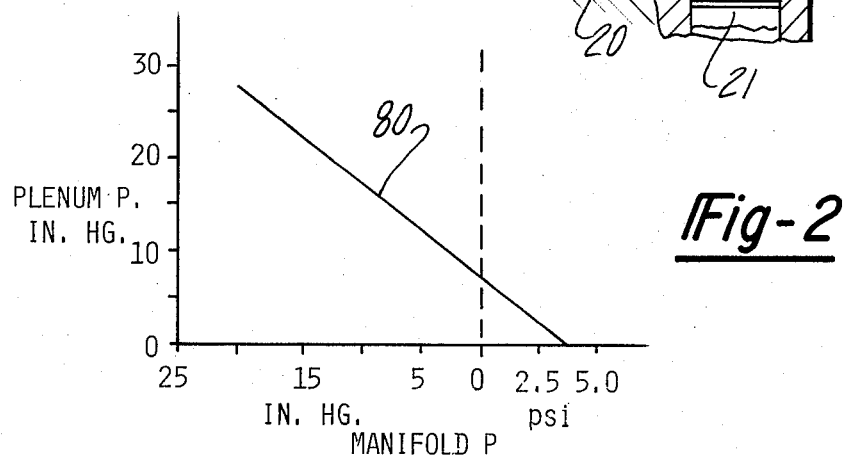

These and other objects of the invention will be apparent from a consideration of the following description and from the drawings in which:

FIG. 1 is a schematic showing of an induction system of an internal combustion engine embodying the control of the present invention; and FIG. 2 is graph illustrating operating characteristics of the induction system of the present invention.

The present invention is embodied in an induction system for an internal combustion engine including a carburetor 10 having an induction passage 12 under the control of a throttle valve 14. A turbocharger compressor 16 receives the air and fuel charge from the induction passage 12 and carburetor plenum 18 and delivers it at an increased pressure to the intake manifold 20 communicating with a cylinder 21 of the engine. The turbocharger compressor 16 is driven by a turbine 22 rotated in response to the flow of exhaust gases from the cylinder 21 in the exhaust manifold system 24.

The fuel induction system also includes a power enrichment control indicated diagrammatically at 26. The power enrichment control 26 may take various forms but in general includes a metering rod 28 controlling the delivery of fuel to the carburetor 10. The rod 28 is moved in response to vacuum pressure in a vacuum actuator 30 so that when the throttle 14 is closed and the engine is under light load, a high vacuum is delivered to the vacuum actuator 30 causing the piston 32 to move downwardly. This results in downward movement of the metering rod 28 tending to close the opening 34 so that less fuel is delivered to the carburetor resulting in a lean or low fuel to air ratio. Conversely when the engine is under heavy load and the throttle 14 is open, a low vacuum pressure will result at the vacuum actuator 30 which permits the vacuum piston 32 as well as the metering rod 28 to move upwardly resulting in a richer or higher fuel to air ratio of the air fuel mixture being delivered to the carburetor.

The power enrichment device 26 is regulated by a control mechanism 40. The control valve 40 includes a housing 42 having a pair of housing cover members 44 and 46. The interior of the housing 42 is divided by a flexible diaphragm 48 the outer periphery of which is clamped between annular flanges 50 and 52 forming part of the housing members 42 and 44, respectively. The flange 50 is bent radially inwardly as indicated at 54 to clamp the housing members 42, 44 and the diaphragm 48 together in fluid tight relationship. The diaphragm 48 forms a control chamber 56 at one side and a regulating chamber 58 at the other side.

The housing cover 44 is provided with a tubular connection 60 which may be connected by a conduit 62 to the intake manifold 20 of the internal combustion engine at some point downstream from the compressor 16. The housing member 46 is provided with axially extending tubular connecting member 64 which may be connected by a flexible conduit 66 to a point in the induction passage 16 such as the carburetor plenum 18 immediately downstream of the throttle valve 20 and upstream of the compressor 16. The cover 46 also has a tube 68 communicating with the vacuum actuator 30 of the fuel enrichment control device 26 by way of a conduit 70.

The tube 64 at the exterior of the housing 42 has an inward extension 72 which as shown in the drawings extends into close proximity to the central portion of the flexible diaphragm 48. When the diaphragm 48 is subjected to differential pressures in the chambers 56 and 58, the diaphragm 48 moves into and out of engagement with the end of the tubular extension 72 which forms an annular valve seat 73 to open and close communication between the carburetor plenum 18 and the chamber 58.

The tubular extension 72 is surrounded by a tubular spring seat element 74 having a flange 76 forming the seat for one end of a compression spring 78. The other end of the spring 78 is seated against an interior wall of the housing cover member 44. In the position shown in FIG. 1 and with atmospheric pressure present in both chambers 56 and 58, the spring 78 acts to lift and maintain the diaphragm 48 in a slightly spaced relationship from the valve seat 73 at the end of the tubular extension 72. This maintains communication from the carburetor plenum 18 through conduit 66, through chamber 58 and through conduit 66 to the vacuum actuator 30 of the fuel or power enrichment device 26. When the absolute pressure in the manifold 20 increases after the engine has started to operate, the same pressure will be established in the chamber 56. At the same time operation of the engine will cause a vacuum pressure to be established in the carburetor plenum 18 which also is established at the opposite side of the diaphragm 48 in the chamber 58. As the absolute manifold pressure increases as the engine is subjected to load, the pressure in chamber 56 at one side of diaphragm 48 is opposed by the spring 78 and the vacuum pressure from the carburetor plenum 16 in chamber 58 at the opposite side of diaphragm 48.

The operation of the control mechanism 40 will best be understood by reference to FIG. 2 showing a typical performance curve of the control device 40. In FIG. 2 the abscissa represents the manifold absolute pressure which varies from a high vacuum through atmospheric pressure to approximately 3.5 psi. The ordinate represents the vacuum signal which is established in the chamber 58 and therefore is made available at the vacuum cylinder. This vacuum pressure varies from a low of approximately 26 inches of mercury to a high of atmospheric pressure. The size of the diaphragm 48 and the spring 78 are so selected that the line 80 represents the limit of pressures. At any point below line 80 the vacuum signal from the carburetor plenum will be equal to the signal available at the output tube 68 and therefore the vacuum actuator 30. Also it will be apparent that the vacuum signal available at the vacuum actuator 30 when expressed in terms of absolute pressure will be less than the manifold absolute pressure but in direct proportion thereto. Also, the vacuum signal to the power enrichment device always is in terms of vacuum even though the engine intake manifold pressure may vary from a vacuum to a positive atmospheric pressure.

A fuel control system for induction system for a turbocharged internal combustion engine has been provided in which the vacuum signal is supplied to a fuel control device in proportion to the pressure developed in the intake manifold of the turbocharged engine even though the pressure in the intake manifold may exceed vacuum pressure. This is accomplished by a device which senses pressure both upstream and downstream of the compressor and the differential is applied to a diaphragm moving relative to a valve seat to control the vacuum signal made available at the fuel control device.

The embodiments of the invention in which an exclusive property or privilege is claimed are defined as follows:

1. A fuel control system for an internal combustion engine induction system wherein combustion air and fuel is drawn from a carburetor through a compressor section of a turbo charger and into an intake manifold, the combination comprising; a pressure responsive fuel control means for delivering fuel to said carburetor, a housing including a diaphragm forming a regulating chamber at one side and a control chamber at the other side of said diaphragm, said regulating chamber being connected to a first source of pressure at a point upstream of said compressor and said control chamber being connected to a second source of pressure at a point downstream of said compressor, a passage communicating said fuel control means with said regulating chamber, valve means between said first source of pressure and said regulating chamber, said valve means including an opening communicating with said induction system upstream of said compressor, said diaphragm being movable into and out of engagement with said opening to close and open the latter, respectively, to control communication between said first source of pressure and said fuel control means in proportion to the pressure in said control chamber.

2. The combination of claim 1 and further comprising resilient means acting on said diaphragm to assist the pressure in said regulating chamber to urge the diaphragm in opposition to the pressure in said control chamber.

3. The combination of claim 2 in which said resilient means includes an annular element surrounding said valve opening and spring means urging said annular element into contact with said diaphragm.

4. The combination of claim 1 wherein said valve means include a seat portion forming an opening in said regulating chamber communicating with said first source of pressure, said diaphragm being movable relative to said seat in proportion to differential pressure at said first and second sources of pressure acting on opposite sides of said diaphragm.

5. An induction system for a turbo charge internal combustion engine wherein combustion air and fuel is drawn through a carburetor, through a compressor section and into an intake manifold, the combination comprising; a pressure responsive fuel control means for delivering fuel to said carburetor, a housing including a diaphragm forming a regulating chamber at one side and a control chamber at the other side of said diaphragm, said regulating chamber being in communication with said fuel control means, a port communicating with said regulating chamber and being connected to a first source of variable pressure at a point upstream of said compressor, said control chamber being connected to a second source of variable pressure at a point downstream of said compressor, a valve seat communicating with said port, an annular element surrounding said seat and spring means urging said annular element into engagement with said diaphragm to maintain said diaphragm in spaced relation to said seat, said diaphragm having a portion movable relative to said seat to control fluid flow between said first source of variable pressure and said fuel control means in proportion to the variable pressure in said control chamber.

* * * * *